United States Patent

Schroeder et al.

[11] Patent Number: 5,899,507
[45] Date of Patent: May 4, 1999

[54] RISER FITTING

[75] Inventors: Gregory D. Schroeder, Berea; Vincent E. Beasley, Cleveland, both of Ohio

[73] Assignee: The Pipeline Development Company, Westlake, Ohio

[21] Appl. No.: 08/934,242

[22] Filed: Sep. 19, 1997

Related U.S. Application Data

[63] Continuation-in-part of application No. 08/799,254, Feb. 14, 1997, abandoned.

[51] Int. Cl.$^6$ ..................................................... F16L 17/06
[52] U.S. Cl. .......................... 285/343; 285/368; 285/322; 285/288.1; 285/901; 285/906
[58] Field of Search .................................... 285/337, 368, 285/343, 322, 323, 901, 906, 288.1

[56] References Cited

U.S. PATENT DOCUMENTS

| | | |
|---|---|---|
| 428,846 | 5/1890 | Leonard . |
| 455,178 | 6/1891 | Dillenburg . |
| 921,247 | 5/1909 | Herrick . |
| 1,563,161 | 11/1925 | Christenson ........................ 285/368 X |
| 1,604,580 | 10/1926 | Jaques . |
| 1,654,463 | 12/1927 | Jaques . |
| 2,070,855 | 2/1937 | Bronsell ..................................... 138/89 |
| 2,216,481 | 10/1940 | Wolferz ................................... 285/132 |
| 2,338,307 | 1/1944 | Staggers .................................. 285/132 |
| 2,374,574 | 4/1945 | Adams, Jr. .............................. 285/138 |
| 2,459,956 | 1/1949 | Muller ..................................... 285/123 |
| 2,496,402 | 2/1950 | McVeigh et al. ........................ 242/124 |
| 2,507,261 | 5/1950 | Mercier ................................... 285/132 |
| 3,149,860 | 9/1964 | Hallesy ..................................... 285/18 |
| 3,387,867 | 6/1968 | Rogers ..................................... 285/336 |
| 3,414,297 | 12/1968 | Pollia ........................................ 285/98 |
| 3,498,648 | 3/1970 | Hallesy ................................... 285/343 |
| 3,587,010 | 6/1971 | Walsh ................................. 285/368 X |
| 3,594,023 | 7/1971 | Yano ....................................... 285/337 |
| 3,997,199 | 12/1976 | Arnold .................................... 285/322 |
| 3,998,477 | 12/1976 | Delahaye et al. ........................ 285/93 |
| 4,000,921 | 1/1977 | Daspit .................................... 285/336 |
| 4,109,945 | 8/1978 | Manchester et al. .................... 285/323 |
| 4,124,231 | 11/1978 | Ahlstone ................................... 285/18 |
| 4,127,289 | 11/1978 | Daspit .................................... 285/322 |
| 4,138,145 | 2/1979 | Lawrence ................................. 285/23 |
| 4,138,147 | 2/1979 | Manchester et al. .................... 285/165 |
| 4,218,078 | 8/1980 | Lee ..................................... 285/368 X |
| 4,239,266 | 12/1980 | Mynhier ................................. 285/323 |
| 4,281,856 | 8/1981 | Litman et al. ............................ 285/15 |
| 4,330,143 | 5/1982 | Reneau ................................... 285/322 |
| 4,413,845 | 11/1983 | Lawrence ................................. 285/23 |
| 4,457,541 | 7/1984 | Kelly et al. ............................... 285/23 |
| 4,610,471 | 9/1986 | Halen et al. ............................ 285/337 |
| 4,832,379 | 5/1989 | Smith et al. ............................ 285/323 |
| 5,131,632 | 7/1992 | Olson ..................................... 285/382 |
| 5,267,612 | 12/1993 | Cassin ....................................... 166/86 |
| 5,421,623 | 6/1995 | Cassin ..................................... 285/343 |
| 5,437,482 | 8/1995 | Curtis ..................................... 285/174 |

FOREIGN PATENT DOCUMENTS

| | | | |
|---|---|---|---|
| 814289 | 6/1969 | Canada .................................... 285/52 |
| 1175126 | 3/1959 | France . |
| 350608 | 7/1919 | Germany . |
| 551768 | 2/1931 | Germany . |
| 806614 | 7/1949 | Germany . |
| 2338447 | 2/1975 | Germany . |
| 24 36 112 | 2/1975 | Germany . |
| 512537 | 6/1957 | Italy ....................................... 285/368 |
| 2102091 | 1/1983 | United Kingdom .................. 285/368 |
| 4002770 | 2/1994 | WIPO .................................... 285/368 |

*Primary Examiner*—Dave W. Arola
*Attorney, Agent, or Firm*—Pearne, Gordon, McCoy & Granger LLP

[57] ABSTRACT

A collet-type pipe coupling of simplified construction includes three main flange parts and a grip structure. The main flange parts are machined or otherwise formed with plain shapes. One flange is welded to an associated length of pipe or other body and all of the flanges are assembled over a separate length of pipe. A first set of bolts is tightened to compress a packing carried in the welded flange with an intermediate flange. A second set of bolts draws a flange collar towards the intermediate flange to constrict the grip structure radially into locking engagement with the separate length of pipe to complete a coupling installation.

11 Claims, 4 Drawing Sheets

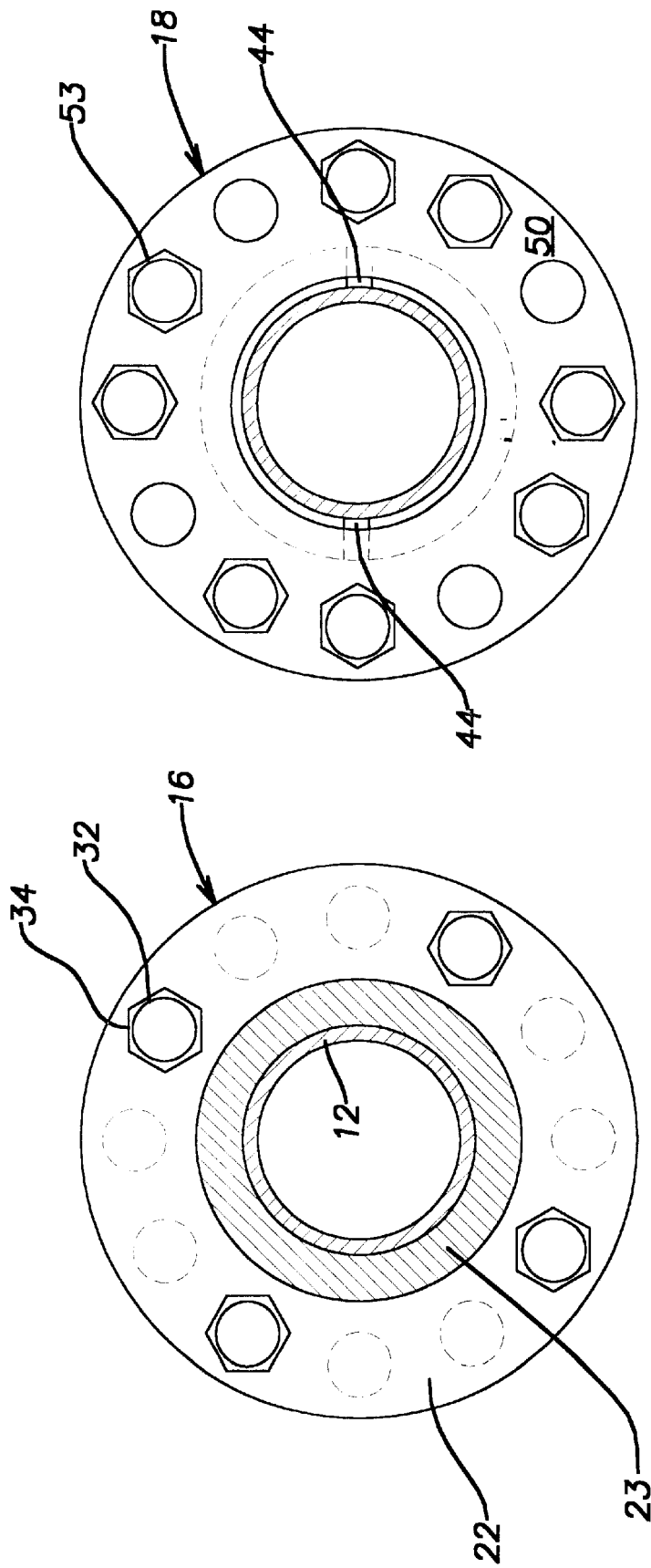

RISER FITTING

This application is a continuation-in-part of application Ser. No. 08/799,254, filed Feb. 14, 1997 now abandoned.

The invention relates to couplings for pipe lines and, more particularly, to a fitting for mechanically coupling a plain pipe end.

PRIOR ART

The repair of existing pipe systems often requires a pipe to be cut off at some point along its length and joined with a replacement length of pipe. In many cases, depending on such factors as the environment of the pipe, it is not practical to couple the new length by welding. An example of a frequently needed repair is a section of a riser in an off shore gas or oil line. The high frequency of repair in this type of service is the result of corrosion of the line at the water surface due to the effects of salt water, air and wave action. These effects accelerate the corrosion of the line at this area and cause it to need replacement substantially earlier than that of underwater sections.

U.S. Pat. Nos. 4,127,289 to Daspit and 4,239,266 to Mynhier disclose examples of mechanical "collet" type pipe couplings suggested for underwater use. Typically, such couplings incorporate wedges or "slips" which circumferentially grip the pipe. The wedges are tightened by axial bolts which, as they are tightened, cause the wedges to be cammed radially inwardly against the pipe. U.S. Pat. No. 4,832,379 to Smith et al. illustrates a similar type of riser fitting. In general, known types of these couplings can be relatively expensive to manufacture, complicated to assemble and install and bulky in size.

SUMMARY OF THE INVENTION

The invention provides an improved collet-type pipe fitting that is simple to manufacture and install and that also affords a high level of performance including end pull resistance. As disclosed, the fitting comprises four principle parts that can each be fabricated from elementary disc-like shapes by simple turning operations, for example. The parts, owing to their simple geometry, are economical to manufacture, jam-proof in assembly and installation and rugged in service.

In one preferred embodiment, the fitting includes an annular weld flange that is welded at one side to an end of one pipe section which in the case of the riser application is a replacement length of pipe. At its opposite side, this weld flange is proportioned to receive the end of another pipe length and includes an annular cavity for a packing ring that seals the other pipe length. An intermediate annular flange for assembly on the other pipe length has an annular extension adapted to compress the packing when associated bolts are tightened. A circular collar, also assembled over the other pipe length has a conical bore in which are received arcuate grip segments. The grip segments have outer surfaces complementary to the conical collar bore and inner surfaces complementary to the exterior of the other pipe length. The grip segments are relatively large parts and, advantageously, are few in number.

The fitting can be installed with a limited number of steps, each of which is straight-forward. With the main parts assembled over the other pipe end, draw bolts are tightened to pull the center flange towards the weld flange to thereby compress and seal the packing against the exterior of the other pipe end. Then, other draw bolts are tightened to pull the grip collar towards the center flange. At this time, the grips being axially confined by a face of the center flange, are cammed radially inwardly against the outside diameter of the other pipe end. Ideally, the draw bolts for the packing and for the grips are the same wrench size, preferably a large and robust size, that can be driven by power equipment ordinarily available to a pipe line installation or service contractor.

In another embodiment, similar to that described above, a fitting is arranged with bolts, for sealing and clamping, that are accessible for tightening from the same end of the fitting.

The disclosed fitting construction is particularly suited for use as a riser fitting to replace corrosion damaged pipes rising from the sea bed. The fitting's simplicity in construction and installation is advantageous and allows it to be successfully installed even in underwater environments. Additionally, the fitting construction permits it to be disassembled and re-used, if desired.

BRIEF DESCRIPTION OF THE DRAWINGS

FIG. 2 is a transverse cross-sectional view of the fitting taken in the plane 2—2 indicated in FIG. 1;

FIG. 3 is an end view of the fitting taken in the plane 3—3 indicated in FIG. 1;

DESCRIPTION OF THE PREFERRED EMBODIMENTS

Figure 1:
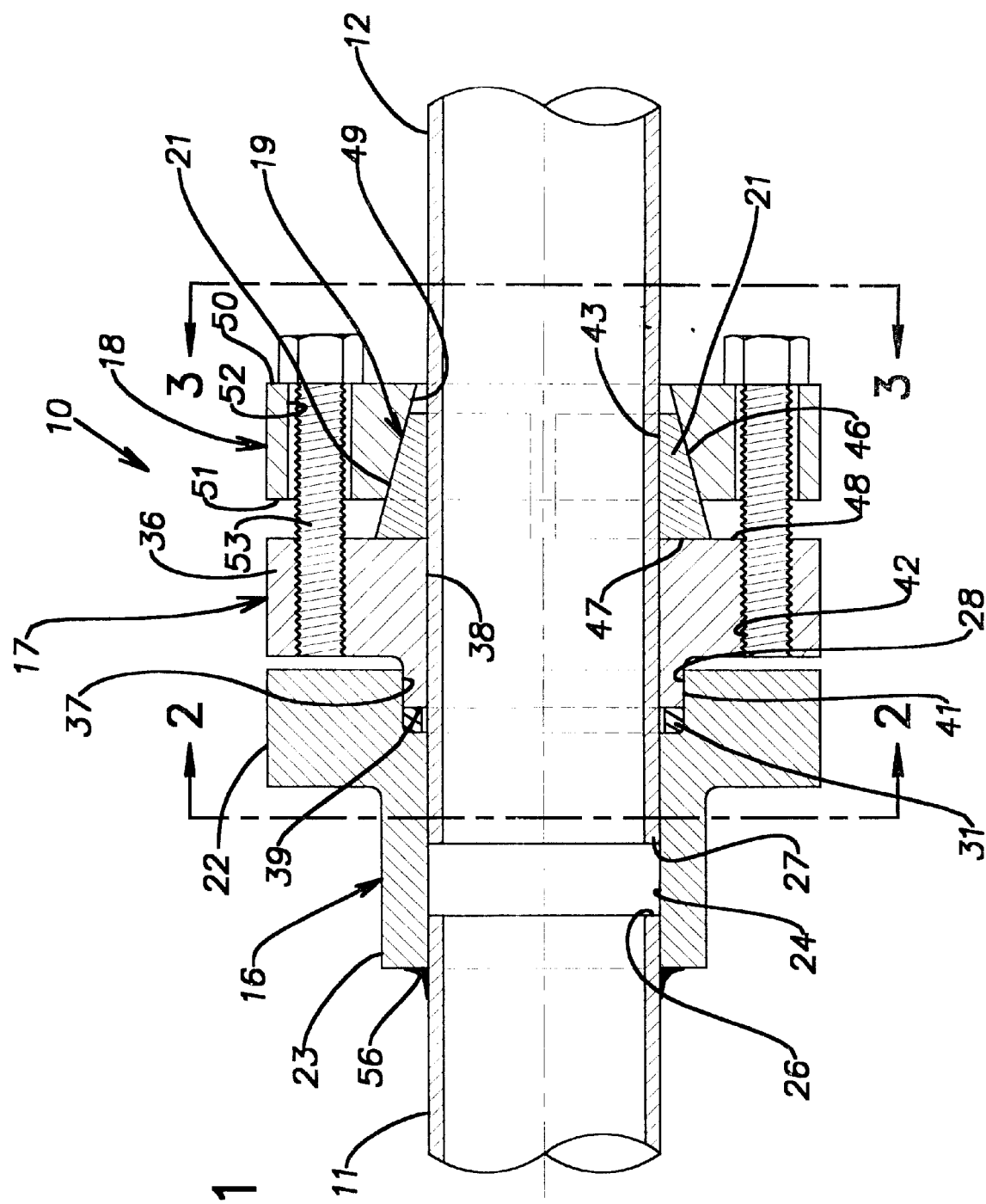
FIG. 1 is a longitudinal cross-section of a pipe fitting constructed in accordance with a first embodiment of the invention and end portions of respective pipe lengths.

A fitting assembly 10 for joining two pipe lengths or sections 11, 12 is typically made of steel or other suitable material. The fitting 10 principally comprises three circumferentially continuous annular parts 16, 17, 18 and an annular grip 19 in the form of arcuate segments 21.

One of the main annular parts 16 comprises a circular disc-like flange 22 and an integral axial extension 23. An internal bore 24 of the flange part 16 is sized to receive the ends 26, 27 of the pipe sections 11, 12. At an inner end of the flange 22, a counter bore 28 provides an annular recess or pocket for a pipe sealing gasket material 31. As shown in FIG. 2, four equally spaced holes 32 extend axially through the flange 22 providing clearance for four associated bolts 34.

The second or center main fitting part 17 is similar in shape to the part 16 having a circular disc or flange portion 36 and an integral axially extending projection or ring 37. An internal bore 38 is sized to receive the pipe section 12 with a slip fit. The axially projecting ring 37 has a generally radial end face 39 and a cylindrical outer surface 41 sized to fit in the counter bore 28 with limited clearance. The flange 36 is formed with a plurality of equally spaced axially extending internally threaded holes about its perimeter. In the illustrated case, these threaded or tapped holes 42 are twelve in number. The holes 42 lie on a common imaginary circle centered on the axis of the fitting 10 and pipe sections 11 and 12. The holes, ideally, are all threaded with the same thread geometry, i.e. diameter and pitch. The holes 42 are arranged so that they receive the four bolts 34 assembled in the fitting part 16.

The annular grip section or structure 19, in the illustrated case, comprises a pair of substantially identical arcuate segments 21. Each segment 21 has an inside generally cylindrical surface 43 adapted to frictionally engage the outside diameter of the pipe 12. The arcuate length of each segment 21 is slightly less than 180° so that a gap 44 exists on diametrally opposite sides of the pipe 12 between arcuate ends of the segments 21. As shown, the gap 44 runs the full axial length of the segments 21. A radial outer surface 46 of each segment 21 is conical and has a slope from the axis of the fitting of, for example, 15°. The segments 21 have a radial face 47 which abuts an adjacent radial face 48 of the central fitting part 17.

The third fitting part 18 is a circular collar or disc. The collar 18 has an internal conical central bore 49 that has an angle which is complementary to the 15° angle of the segments 21. An outer face 50 and an inner face 51 of the collar are substantially radial. As shown in FIG. 3, the collar 18 is drilled or otherwise formed with a plurality of axial extending holes 52. The holes 52 are sized with a clearance fit for bolts 53. As illustrated, the holes 52 are on centers coincident with the centers of the threaded holes 42 in the center flange 17. In assembly, the bolts 53, with reference to their heads, extend in an axial direction opposite that of the first described set of bolts 34.

The various described parts have simple geometries, for the most part with circular or conical surfaces and may be economically fabricated from standard flanges with a minimum of machining and with simple machining steps. For example, the welded flange 16 can be fabricated from a commercially available long welding neck flange, the center flange 17 can be fabricated from a commercially available welding neck flange and the collar 18 can be fabricated from a commercially available slip-on flange.

Where the fitting 10 is used as a riser fitting to repair a corrosion damaged section of the riser, a new piece of pipe represented by the pipe section 11 is welded to the fitting part 16 with a circumferential weld 56. As indicated, a short axial end portion of this pipe section 11 is received in the fitting extension 23. This relation makes it easy to weld the fitting section 16 to the pipe section 11. Typically, the weld 56 can be made on a barge which is being used by the contractor to install the riser fitting. The other pipe section 12 represents the existing riser pipe which has been cut off at the end face 27. The various parts of the fitting are slipped over the end of the existing pipe section 12 and manipulated into the general relation shown in the figures. Once the parts are loosely assembled on the existing pipe 12, the four screws or bolts 34 are tightened, typically by a power wrench to squeeze the packing 31 so that it constricts radially into tight sealing engagement with the exterior of the pipe section 12. Thereafter, the eight bolts associated with the grip collar 14 are progressively tightened to cause the grips to be cammed radially inward by interaction of the respective conical surfaces 49 and 46 of the collar 14 and segments 21. These bolt tightening operations are facilitated by the fact that the packing compression bolts 34 and grip operating bolts 53 are of the same diameter so that the same socket wrench fits them.

It has been found that the anchoring action of the grips 21 is substantial and more than adequate to resist normally expected end pull forces that might be applied to the pipe sections 11 and 12 while they are in service. An added benefit of the disclosed fitting assembly 12 is that it can be disassembled and, if desired, it can be reused. The disclosed grips 21 despite the presence of a smooth pipe generally cylindrical gripping surface at their interior surfaces 43 provide a surprisingly high end pull resistance. At the same time, the angle of the taper of their outside surfaces 46 is such as to not produce a tight interlocking effect with the collar 18 so as to prevent ready disassembly of the fitting from the pipe length 12.

While the disclosed arrangement shows the fitting assembly 10 to be configured to join pipe sections that are of the same diameter, it will be apparent to those skilled in the art that the principles of the invention may be applied to other arrangements where the pipe sections to be joined are of different diameter. If desired, the grips 21 can be more than two in number and/or can be held temporarily in a proper orientation during assembly by a suitable cage or by suitable tack welds or other suitable techniques.

Figure 5:
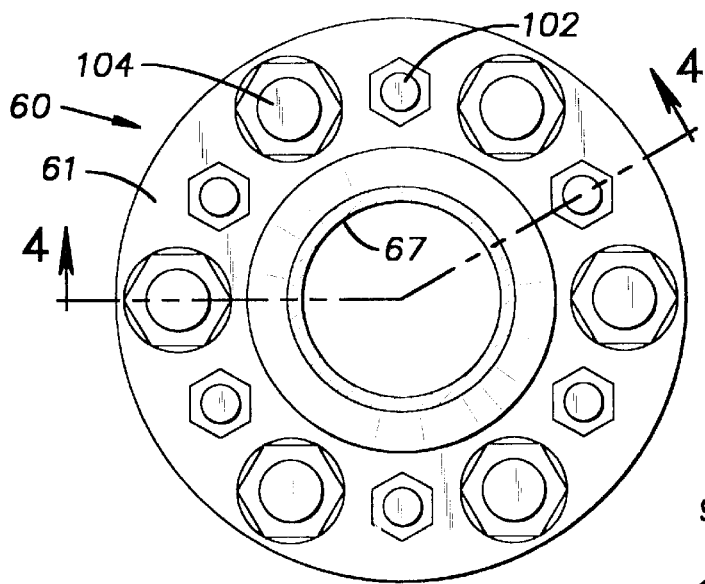
FIG. 5 is an axial view taken in the plane indicated at 5—5 in FIG. 4.
Figure 6:
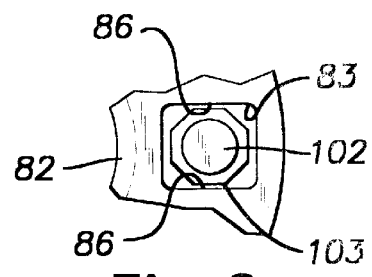
FIG. 6 is a fragmentary view taken in the plane indicated at 6—6 in FIG. 4.
Figure 4:
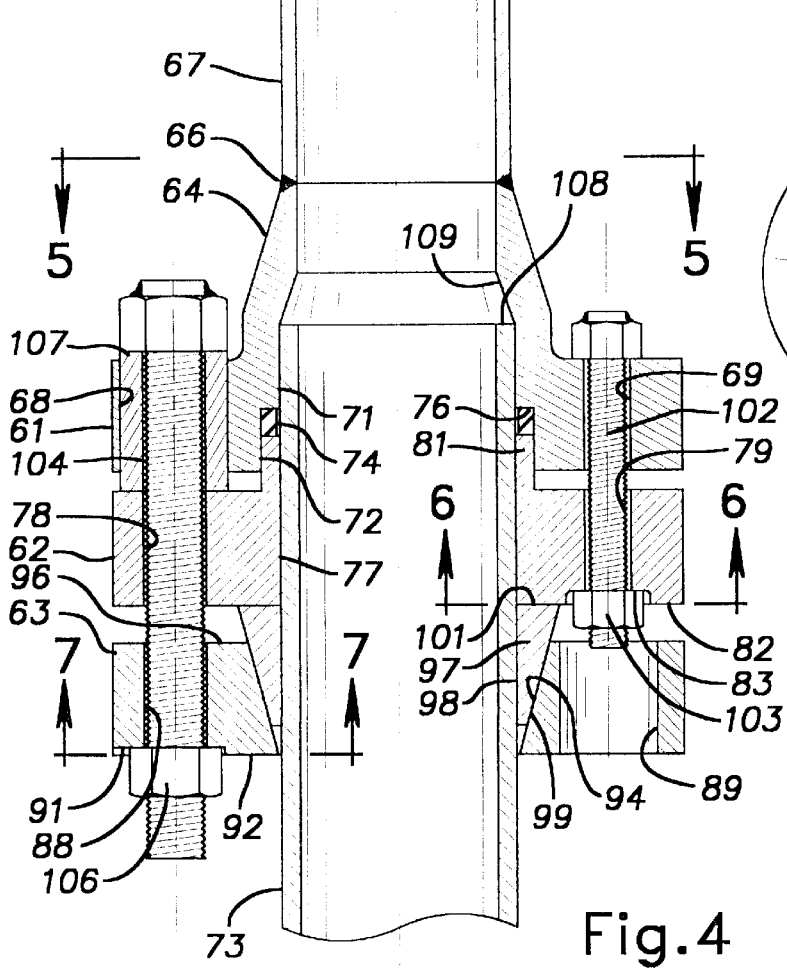
FIG. 4 is a longitudinal cross-sectional view of a pipe fitting constructed in accordance with a second embodiment of the invention.

Referring now to FIG. 4, there is shown another embodiment of a fitting assembly 60, constructed in accordance with the invention, that offers certain advantages in its installation. The assembly 60 includes circumferentially continuous parts comprising a seal flange 61, a middle flange 62 and a grip flange or collar 63. These parts and others to be described are ordinarily formed of steel or other suitable metal by machining, forging and/or with other known processes. The seal flange 61 has an annular weld neck 64 which is suitably beveled at its distal end for a weld bead 66 that connects it to a length of pipe or body 67 which can typically be a riser replacement. The main body of the seal flange 61 is circular and has a series of circumferentially spaced axially oriented holes 68, 69 through it. Alternate holes 68 are relatively large and intervening holes 69 are relatively small. As indicated in FIG. 5, the plane of FIG. 4 is angularly displaced to illustrate both the large and small holes and other construction details.

The interior of the seal flange 61 includes a central axial bore 71 and a counter bore 72. The bore 71 is sized to receive, with moderate clearance, the end of a pipe 73 that, for example, can be an existing part of a riser that has had an upper portion removed for replacement. The counter bore 72 receives a seal or packing 74. The packing 74 is positioned against a radial wall 76 at the inner end of the counter bore 72.

The middle flange 62 has a central cylindrical axial bore 77 sized to slip over the pipe 73 and a series of circumferentially spaced axially oriented holes 78, 79 aligned with respective holes 68, 69 in the seal flange 61. In the illustrated example, the alternate holes 78 are relatively large and the intervening holes 79 are relatively small. At one face of the flange 62 an annular extension or ring 81 exists which is received in the counter bore 72 behind the seal or packing 74. At a generally radial face 82, distal from the seal flange 61, shallow recesses or pockets 83 are machined or otherwise formed around the holes 79. The recesses are bounded by opposed flat surfaces 86 lying in axial planes. The opposed surfaces 86 are parallel to one another and have a predetermined spacing. Radially between the recesses 83 and the bore 62, the face 82 is uninterrupted.

Figure 7:
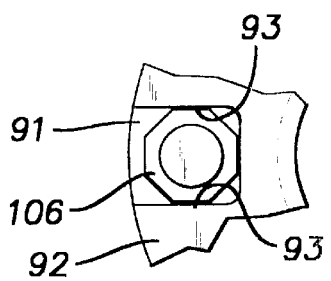
FIG. 7 is a fragmentary view taken in the plane indicated at 7—7 in FIG. 4.

The grip flange 63 is an annular body having a plurality of circumferentially spaced axially oriented cylindrical holes 88, 89 having a pattern corresponding to the holes in the other flanges 61, 62. Alternate holes 88 are relatively small and intervening holes 89 are relatively large. As shown in FIG. 7, the relatively small holes have associated recesses 91 machined or otherwise formed in a radial face 92 distal from the middle flange 62. The recesses 91 include opposed flat faces 93 lying in axial planes at a predetermined mutual spacing. The grip flange has a conical bore 94 tapering radially inwardly with increasing distance from a radial face 96 adjacent the middle flange 62.

Figure 8:
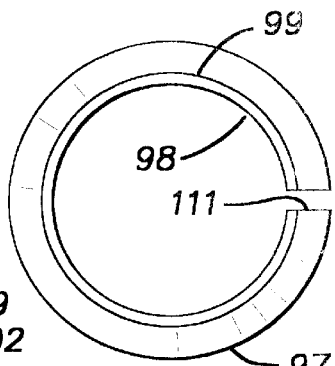
FIG. 8 is an axial view of a pipe grip of the assembly of FIG. 4.

An annular grip 97 of steel or other suitable material is disposed between the middle flange 62 and the grip flange 63. In is free state, the grip 97 has a cylindrical bore 98 sized to slip over the pipe 73. The grip 97 has an outer conical surface 99 that has a taper angle generally complementary to the taper angle of the grip flange bore 94 and in assembly is received in such bore. A radial face 101 of the grip is arranged to abut the radial face 82 of the middle flange. In the illustrated condition, the grip is a unitary C-shaped part formed by milling or otherwise forming a single longitudinal slot in an annular tapered body. The grip is illustrated in an axial view in FIG. 8.

Seal bolts 102 are assembled in the seal flange and middle flange holes 69, 79 and threaded into nuts 103. The nuts 103 are received in the recesses 83 such that the opposed surfaces 86 prevent the associated nut from rotating by engaging the flats of the nut. The holes 89 in the grip flange 63 are large enough to receive the seal nuts 103 without interference.

Grip bolts 104 are assembled in the seal flange, middle flange and grip flange holes 68, 78 and 88 and are threaded into grip nuts 106. The nuts 106 are received in respective recesses 91 where the surfaces 93 engage their flats to prevent them from turning. In the illustrated assembly 60, the seal and grip bolts 102 and 104 are made of suitable lengths of threaded rod stock on which are fixed hex nuts, as by welding, to form the heads of these bolts. An identical cylindrical collar insert 107 is provided in each of the large holes 68 in the seal flange 61. The outside diameter of the insert collar is smaller than the diameter of the holes 68 so that the insert collar can move freely in its respective hole. The inside diameter of the collar 107 is larger than the diameter of a grip bolt 104 so that the shank of the bolt can slide and turn in it. The ends of the collar 107 are formed by flat radial faces. One of the collar faces abuts the face of the middle flange and the other collar face abuts the head of the grip bolt 104 assembled through it. The length of the collar 107 is somewhat greater than the axial length of the rim of the seal flange 61 so that the inner collar face bears against the adjacent face of the middle flange while the outer face of the collar engages the bolt head at a plane spaced away from the rim of the seal flange.

As indicated, the fitting assembly 60 of FIG. 4 is particularly suited for use in repairing risers in undersea pipeline systems. In such applications, the neck 64 of the seal flange 61 is butt-welded to the end of the replacement length of pipe 67 and thereafter the fitting assembly 60 is used to mechanically couple this replacement length to a good part 73 of the original pipeline system. Ordinarily, this welding is performed with the packing 74 out of the counter bore 72. The fitting assembly 60 can be shipped by the manufacturer in a loosely assembled configuration corresponding to FIG. 4. The packing 74 can be removed by separating the seal flange 61 from the middle flange while the middle flange, grip and grip flange can remain bolted together. The seal flange 61 can be removed easily because the grip bolts 104 and collars 107 can pass through the seal flange holes 68. An end 108 of the original pipe 73 is preferably beveled and cleaned before the fitting assembly 60 is installed on it.

For installation on the pipe length 73, the fitting assembly 60 is put together in the configuration of FIG. 4. With the grip bolts 104 hand-tightened and the seal bolts 102 loose, the fitting assembly 60 is lowered by a crane or hoist, for example, axially onto the pipe length 73 so that the pipe end 108 passes into the flanges 61–63. The pipe 73 can be marked to ensure that its end is fully received into the seal flange 61 against a conical bore portion 109. When the pipe 73 is fully received in the fitting assembly 60, the seal bolts 102 are uniformly tightened to cause the middle flange extension 81 to axially compress the seal 74 and thereby cause it to extend radially inwardly into sealing engagement with the exterior of the pipe 73.

The grip bolts 104 are then uniformly tightened to draw the grip flange 63 towards the middle flange 62. The collars 107 transmit the compressive force developed by the bolt heads to the middle flange 62 and allow the bolts 104 to be sufficiently long that their heads are accessible above, i.e. axially outward of the seal flange rim. This grip flange movement, with axial displacement of the grip 97 prevented by abutment of the surfaces 82 and 101 causes the grip to be constricted radially inwardly onto the pipe 73 by camming action between conical surfaces 94, 99 of the grip flange 63 and grip 97. The grip 97 constricts relatively easily because of the circumferential discontinuity introduced by the through slot designated 111 in the wall of the grip and a reliable high clamping force can be developed on the pipe 73 to lock the fitting assembly and pipe together.

It will be understood that the seal bolts 102 and grip bolts 104 are accessible from the same end of the fitting assembly, that is, from the outer or upper side of the seal flange 61. This is an important feature in underwater applications because it allows a diver working with a power wrench to rest the weight of the wrench on the fitting during wrenching operations and minimizes the number of times the diver has to set-up his body position. The disclosed fitting assembly 60 is characterized by a design that involves relatively few parts that are simple to fabricate, are easy to assemble with minimal skill and dexterity and are durable in service. Importantly, the assembly 60 can be disassembled and reused.

Figure 9:
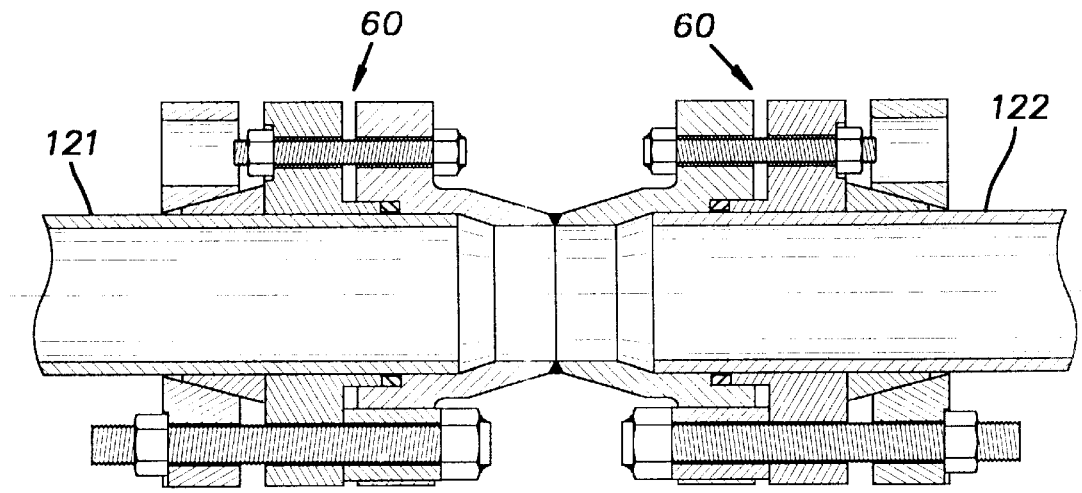
FIG. 9 is a longitudinal cross-sectional view of a pair of fittings used to join two pipe lengths.
Figure 10:
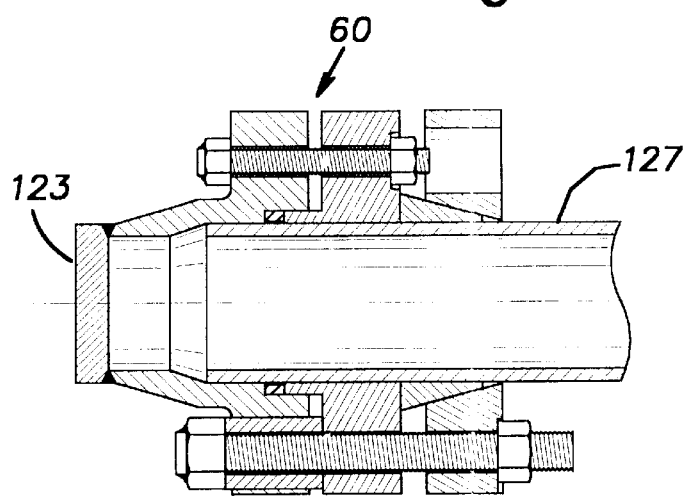
FIG. 10 is a longitudinal cross-sectional view of a fitting used to close off a pipe end.
Figure 11:
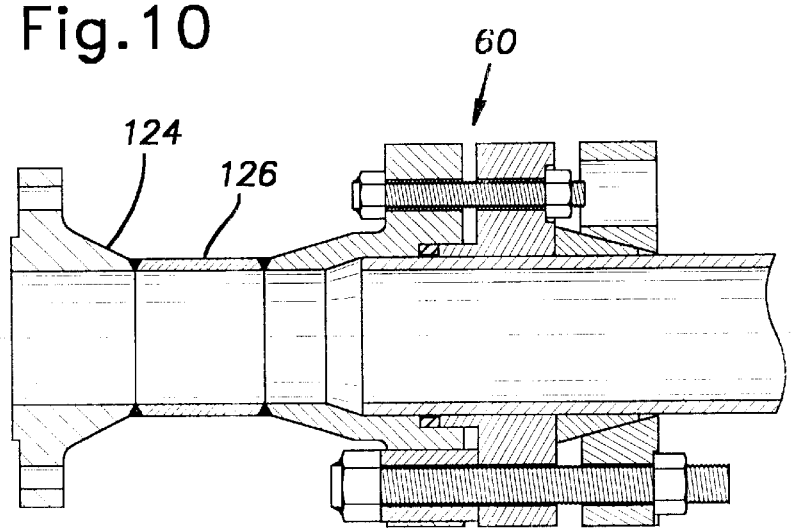
FIG. 11 is a longitudinal cross-sectional view of a fitting used to attach a flange to a pipe.

FIGS. 9 through 11 show additional uses of the fitting assembly 60. In FIG. 9 there is shown two assemblies 60 welded together at their weld necks to form apparatus for mechanically coupling a pair of pipes or bodies 121, 122. In FIG. 10, a plate or body 123 is welded on the weld neck of a fitting assembly 60 to blank off a pipeline 127 or to pressure test a pipeline. Alternatively, the blank 123 may be in the form of a dome welded on the end of the weld neck. In FIG. 11, a standard weld neck flange or body 124 is joined to an assembly 60 by welding it to a short length of pipe 126 and the short length of pipe to the weld neck of the fitting.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

We claim:

1. A fitting for coupling two lengths of pipe comprising first, second and third annular flanges, the first flange being adapted to be welded to one of the lengths of pipe, the first, second and third flanges being adapted to be positioned over the other length of pipe with the second flange being disposed between the first and third flanges when the coupling is assembled for use, the first annular flange including a counter bore, an annular seal disposed in the counter bore, a ring sized to slip over the other length of pipe for axially compressing the seal when the first and second flanges are drawn towards one another and thereby causing the seal to constrict radially against the other pipe length to effect a seal on its outer periphery, the first and second flanges having a first set of aligned axially oriented bolt receiving holes, a first set of bolts in said first set of bolt receiving holes being arranged, upon tightening, to draw said first and second flanges towards one another to axially compress the seal, an annular grip structure adapted to be axially constricted by the second and third flanges, the grip structure having an internal surface engageable with the outside surface of the second pipe length and a tapered radially outer surface, the tapered outer surface increasing in diameter in a direction towards said second flange, the third annular flange having a conical bore complimentary to the tapered radially outer surface of the grip structure, a second set of aligned axially oriented bolt receiving holes in said second and third flanges, a second set of bolts in said second set of aligned holes being arranged upon tightening to draw said second and third flanges towards one another and thereby cam the grip structure radially inwardly into tight gripping engagement with the exterior of the second length of pipe whereby the second length of pipe is connected to the first length of pipe in a fluid tight and end pull resistant manner.

2. A fitting as set forth in claim 1, wherein the first set of bolts extend, with reference to their heads in a first direction, and the second said of bolts extend, with reference to their heads, in a second direction.

3. A fitting assembly as set forth in claim 2, wherein the first and second set of bolts have the same size head whereby they can be driven by the same wrench.

4. A fitting as set forth in claim 1, wherein the holes for receiving said first and second set of bolts are threaded with a common thread size.

5. A fitting for coupling a body onto a length of pipe comprising first, second and third annular flanges, the first flange being adapted to be welded to the body, the first, second and third flanges being adapted to be positioned over the length of pipe with the second flange being disposed between the first and third flanges when the coupling is assembled for use, the first annular flange including a counter bore, an annular seal disposed in the counter bore, a ring sized to slip over the other length of pipe for axially compressing the seal when the first and second flanges are drawn towards one another and thereby causing the seal to constrict radially against the pipe length to effect a seal on its outer periphery, the first and second flanges having a first set of aligned axially oriented bolt receiving holes, a first set of bolts in said first set of bolt receiving holes being arranged, upon tightening, to draw said first and second flanges towards one another to axially compress the seal, an annular grip structure adapted to be axially constricted by the second and third flanges, the grip structure having an internal surface engageable with the outside surface of the pipe length and a tapered radially outer surface, the tapered outer surface increasing in diameter in a direction towards said second flange, the third annular flange having a conical bore complimentary to the tapered radially outer surface of the grip structure, a second set of aligned axially oriented bolt receiving holes in said second and third flanges, a second set of bolts in said second set of aligned holes being arranged upon tightening to draw said second and third flanges towards one another and thereby cam the grip structure radially inwardly into tight gripping engagement with the exterior of the length of pipe whereby the length of pipe is connected to the body in a fluid tight and end pull resistant manner, the first and second set of bolts being arranged to be tightened from the same end of the fitting.

6. A fitting as set forth in claim 5, wherein the first and second set of bolts are arranged to be tightened from the end of the fitting associated with the first flange.

7. A fitting as set forth in claim 6, wherein the second set of aligned axially-oriented bolt receiving holes include holes in said first flange, said first and second set of bolts being accessible for tightening with a wrench disposed at an end of the fitting associated with said first flange.

8. A fitting as set forth in claim 7, wherein the second set of bolts have shoulder surfaces associated with said heads that bear against said second flange.

9. A fitting as set forth in claim 7, wherein said bolts have head portions at a face of said first flange away from said second flange.

10. A fitting as set forth in claim 9, wherein said second set of holes in said first flange are sufficiently large to permit said head portions of said second set of bolts to pass therethrough.

11. A fitting as set forth in claim 5, wherein said grip structure in axial view is an arcuately continuous C-shaped element.

* * * * *